US009794785B2

(12) United States Patent
Akiyoshi

(10) Patent No.: US 9,794,785 B2
(45) Date of Patent: Oct. 17, 2017

(54) COMMUNICATION SYSTEM, CONNECTION CONTROL APPARATUS, MOBILE TERMINAL, BASE STATION CONTROL METHOD, SERVICE REQUEST METHOD, AND PROGRAM

(71) Applicant: NEC CORPORATION, Tokyo (JP)

(72) Inventor: Ippei Akiyoshi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/803,656

(22) Filed: Jul. 20, 2015

(65) Prior Publication Data

US 2015/0327303 A1    Nov. 12, 2015

Related U.S. Application Data

(63) Continuation of application No. 13/119,049, filed as application No. PCT/JP2009/067330 on Oct. 5, 2009, now Pat. No. 9,125,053.

(30) Foreign Application Priority Data

Oct. 6, 2008  (JP) ................. 2008-259659

(51) Int. Cl.
    *H04W 72/02*  (2009.01)
    *H04W 12/06*  (2009.01)
    (Continued)

(52) U.S. Cl.
    CPC ........... *H04W 12/06* (2013.01); *H04W 48/08* (2013.01); *H04W 76/02* (2013.01); *H04W 74/00* (2013.01);
    (Continued)

(58) Field of Classification Search
    CPC ..... H04W 12/06; H04W 48/08; H04W 74/00; H04W 76/02; H04W 84/045;
    (Continued)

(56) References Cited

U.S. PATENT DOCUMENTS 6,687,243 B1  2/2004  Sayers et al. ............... 370/356
7,292,853 B2  11/2007  Nam et al. ................. 455/433
(Continued)

FOREIGN PATENT DOCUMENTS

CN    1863195 A    11/2006
CN  101009627 A     8/2007
(Continued)

OTHER PUBLICATIONS

International Search Report for PCT/JP2009/067330 mailed Dec. 22, 2009.
(Continued)

*Primary Examiner* — Mohamed Kamara
(74) *Attorney, Agent, or Firm* — Sughrue Mion, PLLC

(57) ABSTRACT

A communication system, in which a mobile terminal uses a data path that was generated with an ISP network by a base station in a home network to access a NW via the ISP network, includes an authentication means and connection control means in the ISP network. The base station accepts an access request from the mobile terminal and transmits information relating to the base station and the mobile terminal to the connection control means. The authentication means determines based on the information whether a linking service that connects to the home NW without traversing the ISP network can be provided to the mobile terminal, and if the linking service can be provided, notifies this information to the connection control means. Based on this notification, the connection control means requests the
(Continued)

base station to generate a data path for providing the linking service, and the base station generates the data path.

3 Claims, 9 Drawing Sheets

(51) Int. Cl.
    *H04W 48/08*     (2009.01)
    *H04W 76/02*     (2009.01)
    *H04W 84/12*     (2009.01)
    *H04W 74/00*     (2009.01)
    *H04W 88/08*     (2009.01)
    *H04W 84/04*     (2009.01)

(52) U.S. Cl.
    CPC .......... *H04W 84/045* (2013.01); *H04W 84/12* (2013.01); *H04W 88/08* (2013.01)

(58) Field of Classification Search
    CPC .... H04W 84/12; H04W 88/08; C12Q 1/6883; C12Q 2600/118; C12Q 2600/156; C12Q 2600/158
    USPC .... 370/310.2, 328, 332, 336, 345, 400–401; 455/104, 422.1, 434, 435.2
    See application file for complete search history.

(56) References Cited

U.S. PATENT DOCUMENTS

| | | | | |
|---|---|---|---|---|
| 7,957,705 B1* | 6/2011 | Oh | .......................... | H04B 15/00 455/104 |
| 8,358,647 B2 | 1/2013 | Mahdi et al. | .................. | 370/352 |
| 8,626,223 B2* | 1/2014 | Brisebois | ............ | H04W 52/244 370/318 |
| 8,897,752 B2* | 11/2014 | O'Neil | ................ | H04W 84/045 455/411 |
| 2002/0036991 A1* | 3/2002 | Inoue | ...................... | H04L 12/14 370/328 |
| 2006/0083191 A1 | 4/2006 | Niwano et al. | ................ | 370/328 |
| 2007/0230409 A1 | 10/2007 | Semper et al. | ................ | 370/338 |
| 2007/0250596 A1 | 10/2007 | Baugher | ........................ | 709/218 |
| 2008/0141303 A1 | 6/2008 | Walker et al. | ................... | 725/39 |
| 2009/0005041 A1* | 1/2009 | Steinberg | ............... | H04W 48/18 455/435.2 |
| 2009/0262684 A1 | 10/2009 | Khetawat et al. | ............. | 370/328 |
| 2009/0286506 A1 | 11/2009 | Gu et al. | ........................ | 455/406 |
| 2009/0304009 A1* | 12/2009 | Kolhi | ...................... | H04L 63/08 370/400 |
| 2010/0075658 A1* | 3/2010 | Hou | ....................... | H04W 48/02 455/422.1 |

FOREIGN PATENT DOCUMENTS

| | | |
|---|---|---|
| JP | 2002094543 A | 3/2002 |
| JP | 2004336757 A | 11/2004 |
| JP | 2006053673 A | 2/2006 |
| JP | 2006106974 A | 4/2006 |
| JP | 2007280176 A | 10/2007 |

OTHER PUBLICATIONS

3GPP TR 25.820 V8.1.1, Technical Specification Group Radio Access Networks; 3G Home NodeB Study Item Technical Report (Release 8), May 2008.
Chinese Office Action for CN Application No. 200980139407.X issued on Jun. 4, 2013 with English Translation.
Communication dated Mar. 16, 2017 issued by the European Patent Office in counterpart application No. 09819156.2.
3GPP Standard:" Service requirements for Home NodeBs and Home eNodeBs (Release 9); 3GPP TS 22.220 ", 3rd Generation Partnership Project (3GPP), Sep. 2008, XP050381065 (14 pages total).

\* cited by examiner

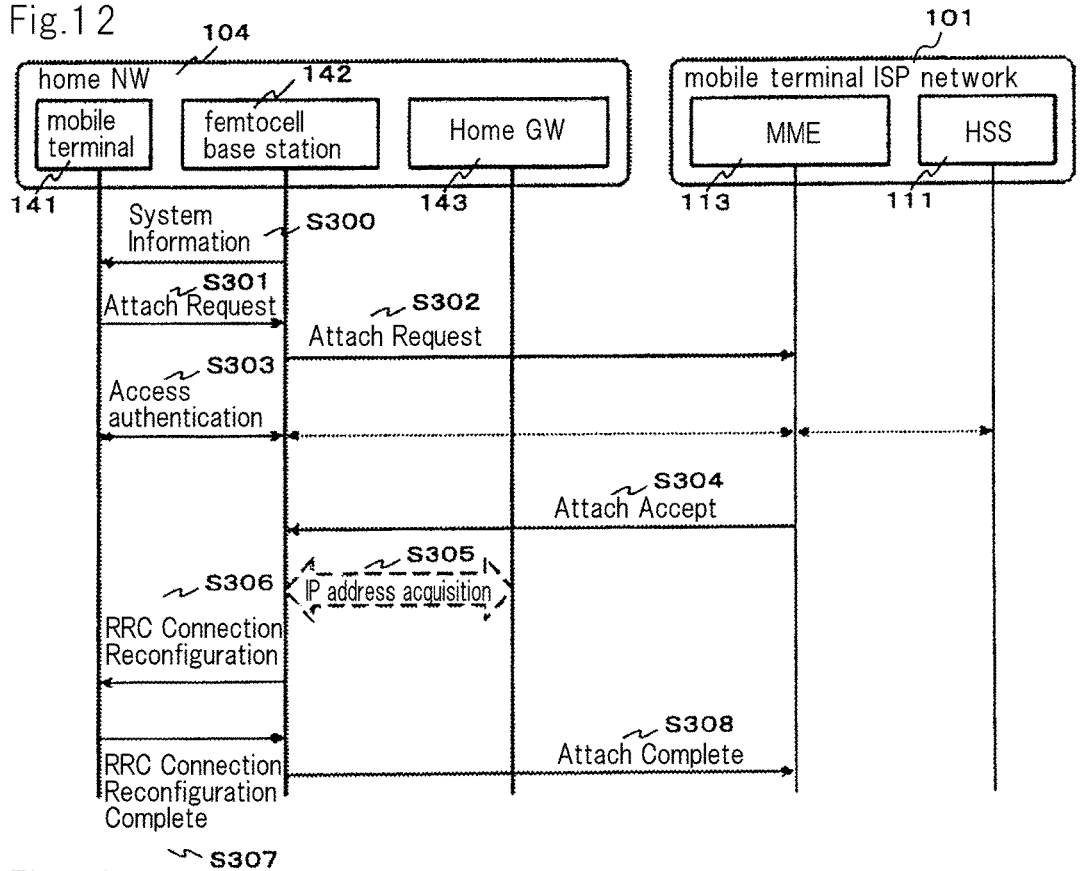
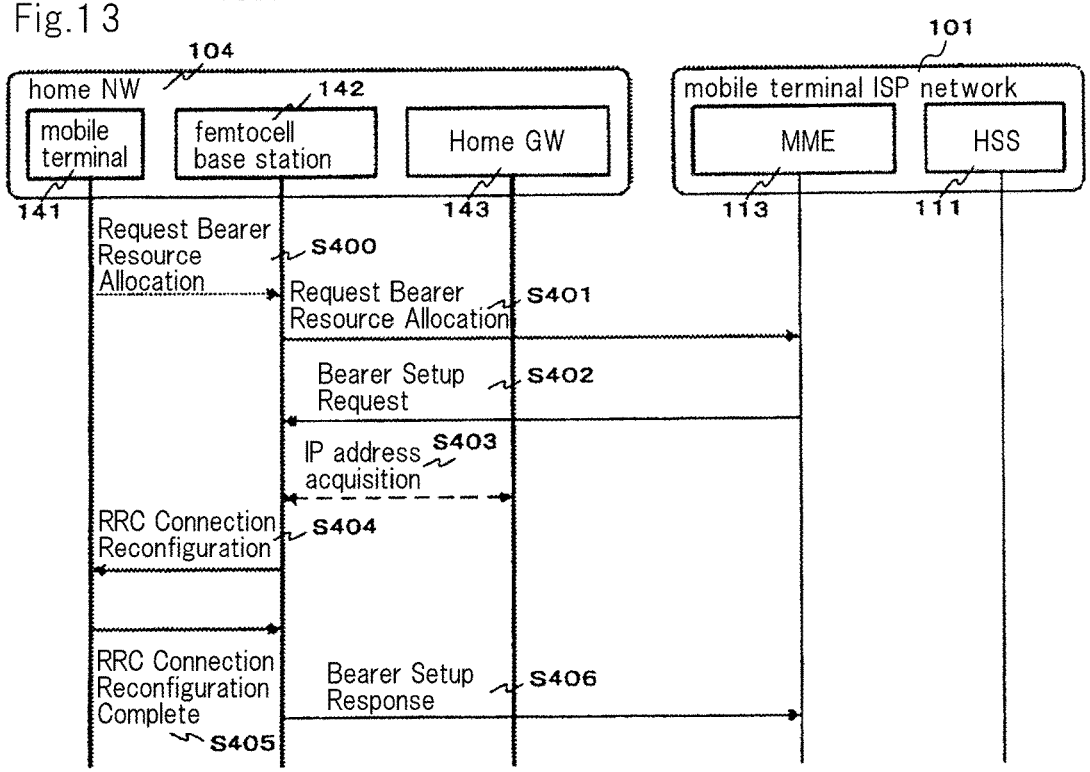

COMMUNICATION SYSTEM, CONNECTION CONTROL APPARATUS, MOBILE TERMINAL, BASE STATION CONTROL METHOD, SERVICE REQUEST METHOD, AND PROGRAM

CROSS-REFERENCE TO RELATED APPLICATIONS

The present application is a continuation application of U.S. patent application Ser. No. 13/119,049 filed on Mar. 15, 2011, which is a National Stage Entry of international application PCT/JP2009/067330, filed Oct. 5, 2009, which claims the benefit of priority from Japanese Patent Application 2008-259659 filed on Oct. 6, 2008, the disclosures of all of which are incorporated in their entirety by reference herein.

TECHNICAL FIELD

The present invention relates to a communication system, a connection control apparatus, a mobile terminal, a base station control method, a service request method, and a program.

BACKGROUND ART

With the development of the so-called third-generation portable telephone systems in recent years, it is becoming possible to install base stations for femtocells with a coverage range having a radius on the order of several tens of meters in offices and residences, to access nodes such as stationary terminals of home NW (Network) or office NW from portable mobile terminals, and to operate these nodes.

An example of a communication system that incorporates this type of femtocell base station is described in 3GPP TR 25.820 V8.0.0 "3G Home Node B Study Item Technical Report (Release 8)" (hereinbelow referred to as Document 1).

FIG. 1 is a block diagram showing an example of the configuration of a communication system that incorporates the femtocell base station described in Document 1.

As shown in FIG. 1, this communication system is made up from: mobile terminal ISP (Internet Service Provider) network 301, Home GW (Gateway) ISP network 302, access network 303, and home NW 304.

In addition, mobile terminal ISP network 301 includes HSS (Home Subscriber Server) 311, PDN (Packet Data Network)-GW 312, MME (Mobility Management Entity) 313, and Serving GW 314; Home GW ISP network 302 includes router 321; access network 303 includes BAS (broadband Access Server) 331; and the home NW includes mobile terminal 341, femtocell base station 342, Home GW 343, and stationary terminal 344.

The operations of a communication system having this type of configuration are next described.

FIG. 2 is a flow chart for describing an example of the operations of the communication system shown in FIG. 1.

As shown in FIG. 2, mobile terminal 341 first transmits to femtocell base station 342 an attach request as an access request for accessing a network by way of femtocell base station 342 (Step 700).

Femtocell base station 342, having received the attach request, transmits an attach trigger to MME 313 by way of Home GW 343, BAS 331, and router 321 (Step 701).

MME 313 receives the attach trigger and, upon detecting the attach request of mobile terminal 341, implements the access authentication of mobile terminal 341 (Step 702).

Upon success of the access authentication of mobile terminal 341, MME 313 transmits a data path generation request to Serving GW 314 (Step 703).

Upon receiving the data path generation request, Serving GW 314 exchanges signaling for generating a data path with PDN-GW 312 and generates a data path between Serving GW 314 and PDN-GW 312 (Step 704). Serving GW 314 then transmits a data path generation response to MME 313 to report the completion of data path generation (Step 705).

Upon receiving the data path generation response, MME 313 transmits a data path generation request to femtocell base station 342 to generate a data path as far as mobile terminal 341 (Step 706).

Upon receiving the data path generation request, femtocell base station 342 generates a data path with mobile terminal 341 (Step 707) and transmits a data path generation response to MME 313 (Step 708).

A data path is thus generated between mobile terminal 341 and PDN-GW 312, whereby mobile terminal 341 is able to access the network from PDN-GW 312 via mobile terminal ISP network 301. Mobile terminal 341 subsequently is able to access and manipulate stationary terminal 344 in home NW 304 via the network.

SUMMARY OF THE INVENTION

Problem to be Solved by the Invention

However, the communication system described in Document 1 has the drawback that the data path between mobile terminal 341 and stationary terminal 344 follows an inefficient communication path. This problem arises because, in the communication system described in Document 1, femtocell base station 342 in home NW 304 connects to mobile terminal ISP network 301 by way of a cellular-existing IF (interface) and establishes a data path between mobile terminal 341 and mobile terminal ISP network 301, and mobile terminal 341 uses this data path to access the network by way of mobile terminal ISP network 301. As a result, when mobile terminal 341 communicates with stationary terminal 344 in home NW 304, all IP packets that are communicated between mobile terminal 341 and stationary terminal 344 traverse mobile terminal ISP network 301.

As a method of solving this drawback, a method can be considered in which mobile terminal 341 communicates with stationary terminal 344 by way of femtocell base station 342 and Home GW 343 without generating a data path with mobile terminal ISP network 301. However, in this case, connection control such as the access authentication of mobile terminal 341 cannot be carried out in mobile terminal ISP network 301. As a result, the mobile terminal ISP that provides a communication system service such as described hereinabove may suffer disadvantages.

It is an object of the present invention to provide a communication system, connection control apparatus, mobile terminal, base station control method, service request method, and program that allow mobile terminal 341 to communicate with another node in home NW 304 by way of femtocell base station 342 without traversing mobile terminal ISP network 301, and further, that allow mobile terminal ISP to control whether this communication can be provided.

Means for Solving the Problem

The communication system of the present invention for achieving the above-described objects includes an ISP (Internet Service Provider) network that is connected to a network that includes a home network and that is a window for accessing the network by the mobile terminal, a base station that is installed within the home network, that accepts a request to access the network from the mobile terminal, and that generates a data path with the ISP network, and a mobile terminal that uses the data path to access the network by way of the ISP network; wherein:

the communication system includes authentication means and connection control means within the ISP network;

the base station, upon accepting a request from the mobile terminal to access the home network, transmits information relating to the base station and the mobile terminal to the connection control means;

the authentication means, upon the reception in the connection control means of the information that was transmitted from the base station, determines based on the information whether a Home NW-linking service that accesses the home network can be provided by way of the base station without traversing the ISP network, and when the Home NW-linking service is possible, reports this capability to the connection control means;

the connection control means, based on the report from the authentication means, requests the base station to generate a data path for providing the Home NW-linking service; and the base station, in accordance with the request from the connection control means, generates a data path for providing the Home NW-linking service.

The authentication apparatus of the present invention for achieving the above-described objects is an authentication apparatus that is connected to a network that includes a home network and that is installed within an ISP network that is a window by which a mobile terminal accesses the network; wherein: the authentication apparatus, upon reception in the connection control means that is installed within the ISP network of information that is transmitted from a base station that is installed within the home network and that relates to the base station and to the mobile terminal that submitted a request to the base station for access to the home network, determines based on the information whether a Home NW-linking service that accesses the home network via the base station without traversing the ISP network can be provided to the mobile terminal, and if the Home NW-linking service can be provided, reports this capability to the connection control means.

The connection control apparatus of the present invention for achieving the above-described objects is a connection control apparatus that is connected to a network that includes a home network and that is installed within an ISP network that is a window by which a mobile terminal accesses the network, wherein: when information is received that was transmitted from a base station that is installed within the home network and that relates to the base station and to the mobile terminal that submitted a request to the base station for access to the home network, and a notification is received from authentication means that is installed within the ISP network indicating that a Home NW-linking service that accesses the home network via the base station without traversing the ISP network can be provided to the mobile terminal, the connection control apparatus requests the base station to generate a data path for providing the Home NW-linking service.

The base station of the present invention for achieving the above-described objects is a base station that is installed within a home network, that receives a request from a mobile terminal for access to a network that includes the home network, that is connected to the network, and that generates, with an ISP network that is a window by which the mobile terminal accesses the network, a data path used by the mobile terminal to access the network via the ISP network; wherein the base station, upon receiving a request from the mobile terminal for access to the home network, transmits information relating to the base station and the mobile terminal to a connection control means that is installed within the ISP network, and upon being requested from the connection control means to generate a data path for providing a Home NW-linking service that accesses the home network without traversing the ISP network, generates the data path.

The mobile terminal of the present invention for achieving the above-described objects is a mobile terminal that submits to a base station that is installed within a home network a request for access to a network that includes the home network, that is connected to the network, and that uses a data path that was generated by the base station with an ISP network that is a window for accessing the network to access the network via the ISP network; wherein the mobile terminal, at the time of a request for access to the home network, transmits via the base station to a connection control means that is installed within the ISP, information indicating whether the provision of a Home NW-linking service that accesses the home network via the base station without traversing the ISP network is desired.

To achieve the above-described objects, the method of the present invention for determining whether service can be provided is a service provision capability determination method realized by an authentication apparatus that is connected to a network that includes a home network and that is installed within an ISP network that is a window by which a mobile terminal accesses the network, the method including a step of, when information that is transmitted from a base station that is installed in the home network and that relates to the base station and the mobile terminal that submitted a request to the base station for access to the home network is received in a connection control means that is installed within the ISP network, determining based on the information whether a Home NW-linking service that accesses the home network via the base station without traversing the ISP network can be provided to the mobile terminal, and when the Home NW-linking service can be provided, reporting this capability to the connection control means.

The base station control method of the present invention for achieving the above-described objects is a base station control method implemented by a connection control apparatus that is connected to a network that includes a home network and that is installed within an ISP network that is a window by which a mobile terminal accesses the network, the base station control method including a first request step of, when information that is transmitted from a base station installed within the home network and that relates to the base station and to the mobile terminal that has submitted a request to the base station for access to the home network is received and notification is received from authentication means installed within the ISP network indicating that a Home NW-linking service that accesses the home network via the base station without traversing the ISP network can be provided to the mobile terminal, requesting the base station to generate a data path for providing the Home NW-linking service.

The data path generation method of the present invention for achieving the above-described objects is a data path generation method implemented by a base station that is installed within a home network, that receives a request from a mobile terminal for access to a network that includes the home network, that is connected to the network, and that generates a data path with an ISP network that is a window by which the mobile terminal accesses the network and that is used by the mobile terminal to access the network via the ISP network; the data path generation method including a generation step of, when a request for access to the home network is received from the mobile terminal, transmitting information relating to the base station and the mobile terminal to connection control means that is installed within the ISP network, and when the generation of a data path for providing a Home NW-linking service that accesses the home network without traversing the ISP network is requested from the connection control means, generating the data path.

The service request method of the present invention for achieving the above-described objects is a service request method realized by a mobile terminal that submits a request to a base station that is installed within a home network for access to a network that includes the home network, that is connected to the network, and that uses a data path generated by the base station with an ISP network that is a window for accessing the network to access the network by way of the ISP network; wherein the service request method includes a first request step of, at the time of the access request to the home network, transmitting via the base station to connection control means that is installed within the ISP network information indicating whether the provision of a Home NW-linking service that accesses the home network via the base station without traversing the ISP network is desired or not.

The program of the present invention for achieving the above-described objects causes an authentication apparatus, which is connected to a network that includes a home network and which is installed within an ISP network that is a window by which a mobile terminal accesses the network, to execute a procedure of, when information that is transmitted from a base station that is installed within the home network and that relates to the base station and to the mobile terminal that submitted a request to the base station for access to the home network is received in connection control means that is installed in the ISP network, determining based on the information whether a Home NW-linking service that accesses the home network via the base station without traversing the ISP network can be provided to the mobile terminal, and if the Home NW-linking service can be provided, reporting this capability to the connection control means.

The program of the present invention for achieving the above-described objects causes a connection control apparatus, which is connected to a network that includes a home network and which is installed within an ISP network that is a window by which a mobile terminal accesses the network, to execute a first request procedure of: when information that is transmitted from a base station installed within the home network and that relates to the base station and to the mobile terminal that issued a request to the base station for access to the home network is received and notification that a Home NW-linking service that accesses the home network via the base station without traversing the ISP network can be provided to the mobile terminal is received from an authentication means installed within the ISP network, requesting the base station to generate a data path for providing the Home NW-linking service.

The program of the present invention for achieving the above-described objects causes a base station, which is installed within a home network, which receives a request from a mobile terminal for access to a network that includes the home network, which is connected to the network, and which generates a data path with an ISP network that is a window by which the mobile terminal accesses the network that is used by the mobile terminal for accessing the network by way of the ISP, to execute a generation procedure of, when a request is received from the mobile terminal for access to the home network, transmitting information relating to the base station and to the mobile terminal to connection control means that is installed within the ISP, and when the generation of a data path for providing a Home NW-linking service that accesses the home network without traversing the ISP network is requested from the connection control means, generating the data path.

The program of the present invention for achieving the above-described objects causes a mobile terminal, which issues a request to a base station that is installed within a home network for access to a network that includes the home network, which is connected to the network, and which uses a data path generated by the base station with an ISP network that is the window for accessing the network to access the network by way of the ISP network, to execute a first request procedure of, at the time of an access request to the home network, transmitting via the base station to connection control means that is installed within the ISP network information indicating whether the provision of a Home NW-linking service that accesses the home network via the base station without traversing the ISP network is desired.

BRIEF DESCRIPTION OF THE DRAWINGS

FIG. 12 is a flow chart for describing an example of the operations of the communication system of Working Example 3 of the present invention;

FIG. 13 is a flow chart for describing another example of the operations of the communication system of Working Example 3 of the present invention;

BEST MODE FOR CARRYING OUT THE INVENTION

Modes for carrying out the present invention are next described with reference to the accompanying drawings.

First Exemplary Embodiment

Figure 1:
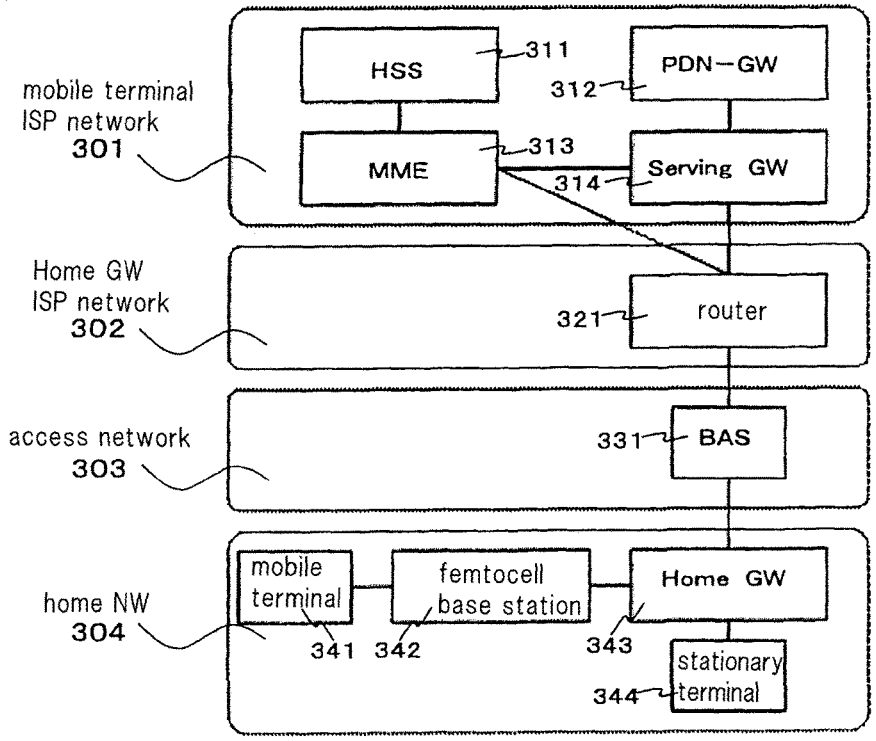
FIG. 1 is a block diagram showing an example of the configuration of a typical communication system.
Figure 2:
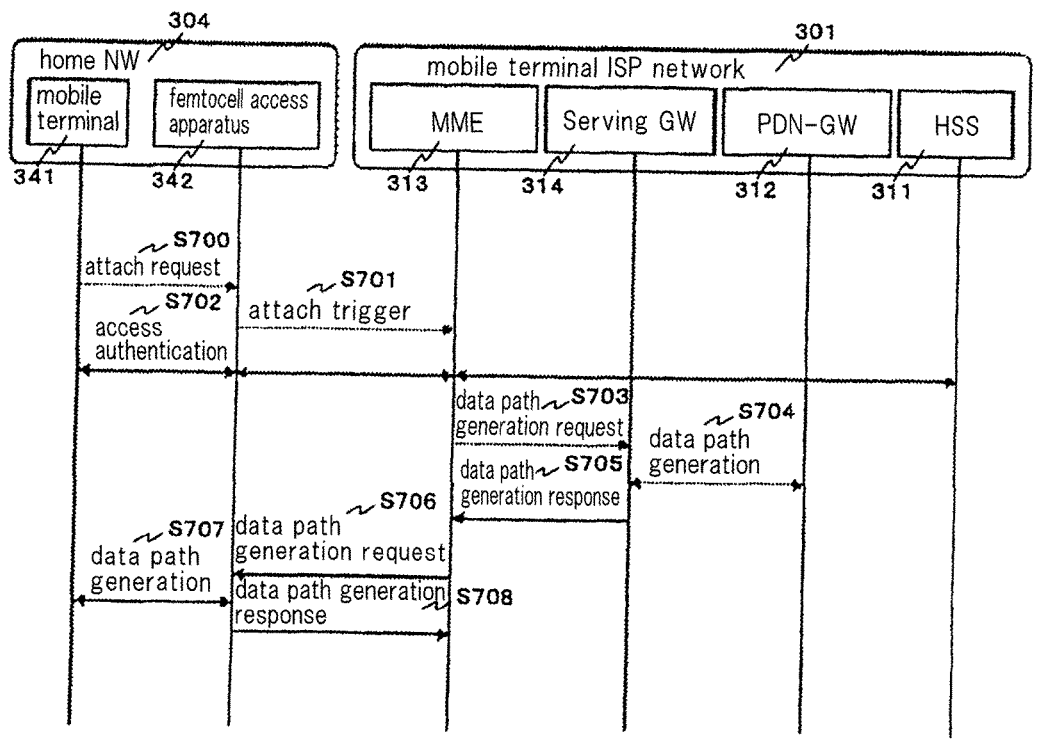
FIG. 2 is a flow chart for describing an example of the operations of the communication system shown in FIG. 1.
Figure 3:
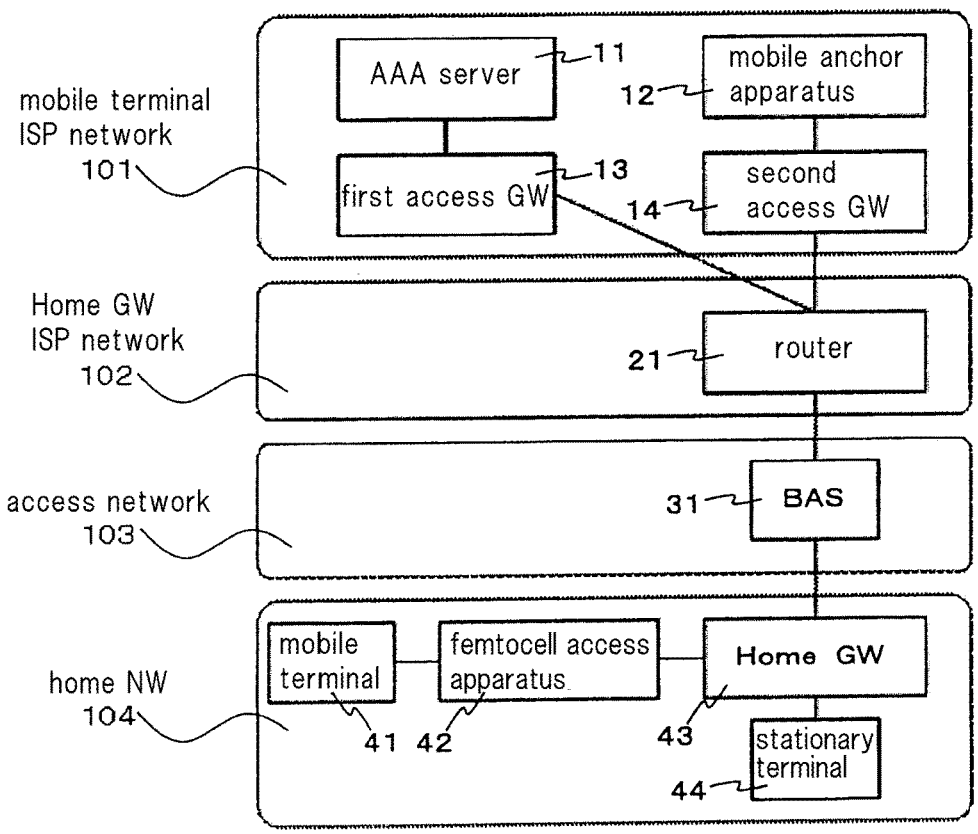
FIG. 3 is a block diagram showing the configuration of the communication system of the first exemplary embodiment of the present invention.

FIG. 3 is a block diagram showing the configuration of the communication system of the first exemplary embodiment of the present invention.

As shown in FIG. 3, the communication system of the present exemplary embodiment is made up from mobile terminal ISP network 101 that is an ISP network; Home GW ISP network 102, access network 103, and home NW 104.

The communication system of the present exemplary embodiment can provide to a mobile terminal, in addition to a service for accessing a network by way of mobile terminal ISP network 101, a Home NW-linking service for accessing home NW 104 without traversing mobile terminal ISP network 101.

Mobile terminal ISP network 101 includes AAA (Authentication, Authorization, and Accounting) server 11, mobile anchor apparatus 12, first access GW (C-plane) 13, and second access GW (U-plane) 14.

In addition, AAA server 11 is one example of the authentication means, and the first access gateway is one example of the connection control means.

AAA server 11 is a server that carries out access authentication of the mobile terminal and that also determines whether a Home NW-linking service can be provided to the mobile terminal.

Mobile anchor apparatus 12 is connected to a network (not shown in the figure) and serves as the window with the network when the mobile terminal accesses the network by way of mobile terminal ISP network 101. Mobile anchor apparatus 12 transfers to the mobile terminal IP packets that are disbursed to the mobile terminal from terminals or servers on the network (not shown).

First access GW (C-plane) 13 implements control of mobile terminals and femtocell access apparatuses (to be described). At the time of access authentication of a mobile terminal, first access GW 13 submits an inquiry to AAA server 11 regarding whether a Home NW-linking service can be provided to the mobile terminal. When the provision of the Home NW-linking service to the mobile terminal is permitted, first access GW 13 further transmits to the femtocell access apparatus a data path generation request instructing the generation of a data path with the mobile terminal.

Second access GW (U-plane) 14 constructs a data path for the mobile terminal between the femtocell access apparatus that is to be described and mobile anchor apparatus 12. Second access GW 14 further transfers to the mobile terminal IP packets that are disbursed to the mobile terminal from apparatuses or servers within mobile terminal ISP network 101.

Although mobile anchor apparatus 12, first access GW 13, and second access GW 14 are here described as separate entities as shown in FIG. 3, they can be merged into a single apparatus.

Home GW ISP network 102 includes router 21.

Router 21 carries out IP routing of IP packets addressed to IP addresses assigned to the Home GW (to be described hereinbelow) or to the prefix of the Home GW or of IP packets having as the transmission origin an IP address assigned to the Home GW or the prefix of the Home GW.

Access network 103 includes BAS 31.

BAS 31 has router capabilities and performs access authentication at the time of an attach request from a mobile terminal or connection to Home GW ISP network 102.

Home NW 104 includes mobile terminal 41, femtocell access apparatus 42, Home GW 43, and stationary terminal 44.

Mobile terminal 41 is a terminal that uses a data path that is generated by femtocell access apparatus 42 to carry out communication by way of femtocell access apparatus 42.

Femtocell access apparatus 42 connects to mobile terminal ISP network 101 by way of Home GW 43, BAS 31, and router 21. At the access start time of mobile terminal 41, femtocell access apparatus 42 transmits to first access GW 13 an attach trigger that includes linking capability information that are information elements indicating that femtocell access apparatus 42 is itself equipped with a HOME NW-linking capability and that the Home NW-linking service can be provided. Upon receiving a request from first access GW 13 to generate a data path with mobile terminal 41, femtocell access apparatus 42 generates a data path between mobile terminal 41 and femtocell access apparatus 42.

Home GW 43 is the gateway apparatus when a terminal within home NW 104 communicates with an outside NW. Home GW 43 is further provided with a capability for assigning IP addresses to terminals within home NW 104 and capability as a DNS (Domain Name System) server.

Stationary terminal 44 is a terminal that uses an IP address disbursed from Home GW 43 to perform communication.

The overall operations of the present exemplary embodiment are next described in detail.

Figure 4:
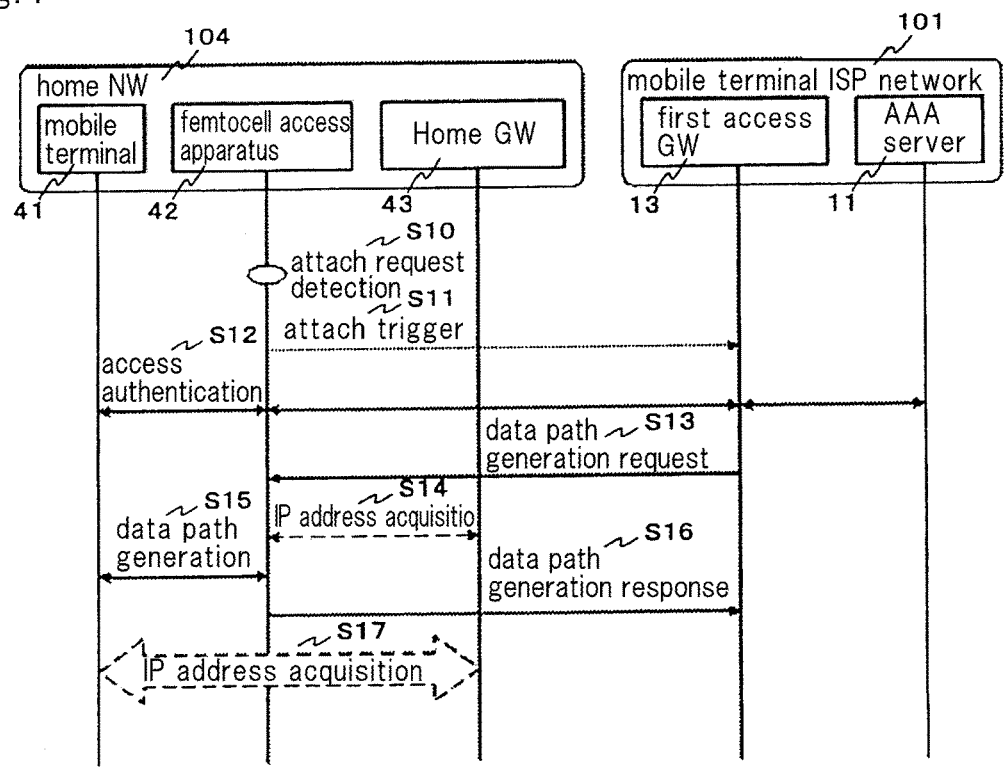
FIG. 4 is a flow chart for describing an example of the operations of the communication system shown in FIG. 3.

FIG. 4 is a flow chart for describing an example of the operations of the communication system shown in FIG. 3.

Referring to FIG. 4, when mobile terminal 41 first begins access to femtocell access apparatus 42 to access home NW 104, femtocell access apparatus 42 detects the attach request of mobile terminal 41 (Step 10). The attach request here described may result from the express transmission of an attach request from mobile terminal 41, or may be occasioned by the establishment of a link between femtocell access apparatus 42 and mobile terminal 41 or the establishment of a Capability Negotiation.

Femtocell access apparatus 42, upon detecting the attach request of mobile terminal 41, transmits to first access GW 13 an attach trigger that includes linking capability information (Step 11). The attach trigger is assumed to include information relating to mobile terminal 41 and femtocell access apparatus 42 such as apparatus identifiers.

Upon receiving the attach trigger, first access GW 13 starts the access authentication of mobile terminal 41 (Step 12). Upon detecting from the linking capability information contained in the attach trigger that femtocell access apparatus 42 is equipped with the HOME NW-linking capability, first access GW 13 transmits an authentication message to AAA server 11 during access authentication to request determination of whether the Home NW-linking service can be provided to mobile terminal 41. The authentication message includes, for example, information relating to mobile terminal 41 and femtocell access apparatus 42 that were contained in the attach trigger.

Upon receiving the authentication message, AAA server 11 determines whether the Home NW-linking service can be provided to mobile terminal 41 based on information relating to mobile terminal 41 and femtocell access apparatus 42 that is contained in the authentication message. As the method of carrying out this determination, methods can be considered that use the relation between the user that uses mobile terminal 41 to receive the communication service and the owner of femtocell access apparatus 42, or, for example, that permit provision when the user and the owner are the same person or have a family relation. The determination can also be carried out based on whether the user has entered into a contract that allows the use of femtocell access apparatus 42 to receive the communication service.

If the Home NW-linking service can be provided to mobile terminal 41, AAA server 11 reports this capability to first access GW function 13 during access authentication. Even if a request for the determination of whether service can be provided is not included in the authentication message received from first access GW 13, AAA server 11 may report this information to first access GW 13 during access authentication if the Home NW-linking service can be provided to mobile terminal 41.

First access GW 13 receives the report that the Home NW-linking service can be provided to mobile terminal 41 from AAA server 11 and transmits to femtocell access apparatus 42 a data path generation request that includes information instructing the generation of a data path for providing the Home NW-linking service (Step 13).

Upon receiving the data path generation request, femtocell access apparatus 42 generates a data path for providing the Home NW-linking service between mobile terminal 41 and femtocell access apparatus 42 (Step 15). If femtocell access apparatus 42 can acquire an IP address for mobile terminal 41 from Home GW 43, femtocell access apparatus 42 further acquires the IP address for mobile terminal 41 in advance (Step 14) and reports this IP address to mobile terminal 41 at the time of generating the data path between mobile terminal 41 and femtocell access apparatus 42.

When generation of the data path between mobile terminal 41 and femtocell access apparatus 42 is completed, femtocell access apparatus 42 reports a data path generation response indicating data path generation completion to first access GW 13 (Step 16). If mobile terminal 41 has not acquired an IP address during the generation of the data path between mobile terminal 41 and femtocell access apparatus 42, mobile terminal 41 acquires an IP address from Home GW 43 after generation of the data path (Step 17).

Using the IP address that was acquired from Home GW 43, mobile terminal 41 is then able to communicate with stationary terminal 44 in home NW 104 without traversing mobile terminal ISP network 101.

The effect of the present exemplary embodiment is next described.

When an access request has been received in femtocell access apparatus 42 from mobile terminal 41 in the communication system of the present exemplary embodiment as described hereinabove, AAA server 11 determines whether the Home NW-linking service can be provided to mobile terminal 41 and notifies first access GW 13 that the service can be provided when the service can be provided, and based on this notification, first access GW 13 issues a request to femtocell access apparatus 42 to generate a data path for providing the Home NW-linking service and femtocell access apparatus 42 generates the data path for providing the Home NW-linking service.

In this way, determination of whether the Home NW-linking service can be provided to mobile terminal 41 can be realized by an apparatus within mobile terminal ISP network 101, and in addition, when service can be provided, femtocell access apparatus 42 is caused to generate a data path for accessing home NW 104 without traversing mobile terminal ISP network 101, whereby communication between mobile terminal 41 and a node within home NW 104 can be carried out by an efficient data path.

Second Exemplary Embodiment

The communication system of the second exemplary embodiment of the present invention is of the same configuration as the communication system of the first exemplary embodiment shown in FIG. 3, but the operations of the second exemplary embodiment differ from those of the first exemplary embodiment in that mobile terminal 41 clearly expresses the desire for the Home NW-linking service and femtocell access apparatus 42 sends linking capability information to mobile terminal 41.

The overall operations of the present exemplary embodiment are next described in greater detail.

Figure 5:
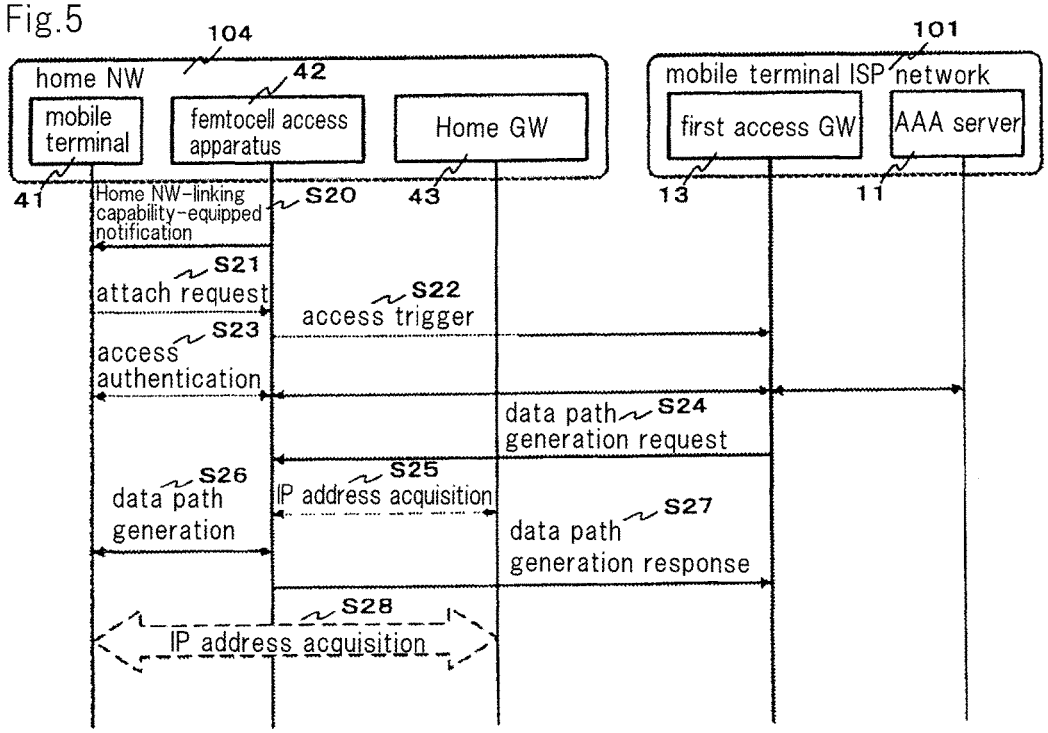
FIG. 5 is a flow chart for describing an example of the operations of the second exemplary embodiment of the present invention.

FIG. 5 is a flow chart showing an example of the operations of the second exemplary embodiment of the present invention. The two points of difference with the operations of the communication system of the first exemplary embodiment shown in FIG. 4 are first that femtocell access apparatus 42 clearly sends linking capability information to mobile terminal 41, and secondly, that mobile terminal 41 transmits to femtocell access apparatus 42 an attach request to which linking-desired information is appended indicating whether the Home NW-linking service is desired or not.

Referring to FIG. 5, femtocell access apparatus 42 first sends by broadcast a Home NW-linking capability-equipped notification that contains linking capability information to all terminals in cells that include mobile terminal 41 (Step 20).

Next, mobile terminal 41 transmits an attach request to femtocell access apparatus 42 to start access to femtocell access apparatus 42 (Step 21). It is here assumed that mobile terminal 41 desires a Home NW-linking service, and mobile terminal 41 appends to the attach request linking-desired information that indicates that the Home NW-linking service is desired. In addition, because femtocell access apparatus 42 sends a Home NW-linking capability-equipped notification in advance, mobile terminal 41 may append the linking-desired information to the attach request only when mobile terminal 41 has detected that femtocell access apparatus 42 is equipped with the Home NW-linking capability. Although the message to which mobile terminal 41 has appended linking-desired information is here taken to be an attach request, the message is not limited to an attach request, and the message may be a message that is transmitted to femtocell access apparatus 42 before an access authentication message arrives in AAA server 11.

Upon receiving the attach request from mobile terminal 41, femtocell access apparatus 42 transmits an attach trigger that contains the linking capability information and linking-desired information contained in the attach request to first access GW 13 (Step 22).

Upon receiving the attach trigger, first access GW 13 begins access authentication of mobile terminal 41 (Step 23). In addition, when first access GW 13 detects from the linking capability information contained in the attach trigger that femtocell access apparatus 42 is equipped with a capability that enables Home NW linking, first access GW 13 transmits an authentication message to AAA server during access authentication to request determination of whether the Home NW-linking service can be provided to mobile terminal 41.

AAA server 11 next determines whether the Home NW-linking service can be provided based on information relating to mobile terminal 41 and femtocell access apparatus 42 that is contained in the authentication message. The method of this determination of capability is similar to that of the first exemplary embodiment and explanation is therefore here omitted. If the Home NW-linking service can be provided, AAA server 11 reports this capability to first access GW 13 during access authentication.

Next, first access GW 13 receives notification from AAA server function 11 that the Home NW-linking service can be provided, takes into consideration the desire of mobile terminal 41 for the Home NW-linking service, and transmits to femtocell access apparatus 42 a data path generation request that includes information instructing the generation of a data path for providing the Home NW-linking service (Step 24).

The subsequent processes (Steps 25-28) are similar to the processes (Steps 14-17) of the first exemplary embodiment shown in FIG. 4, and explanation is therefore here omitted.

Operations are next described for a case in the present exemplary embodiment in which an attach request to which linking-desired information indicating that the Home NW-linking service is not desired has been appended is transmitted to femtocell access apparatus 42 when mobile terminal 41 begins access to femtocell access apparatus 42.

Figure 6:
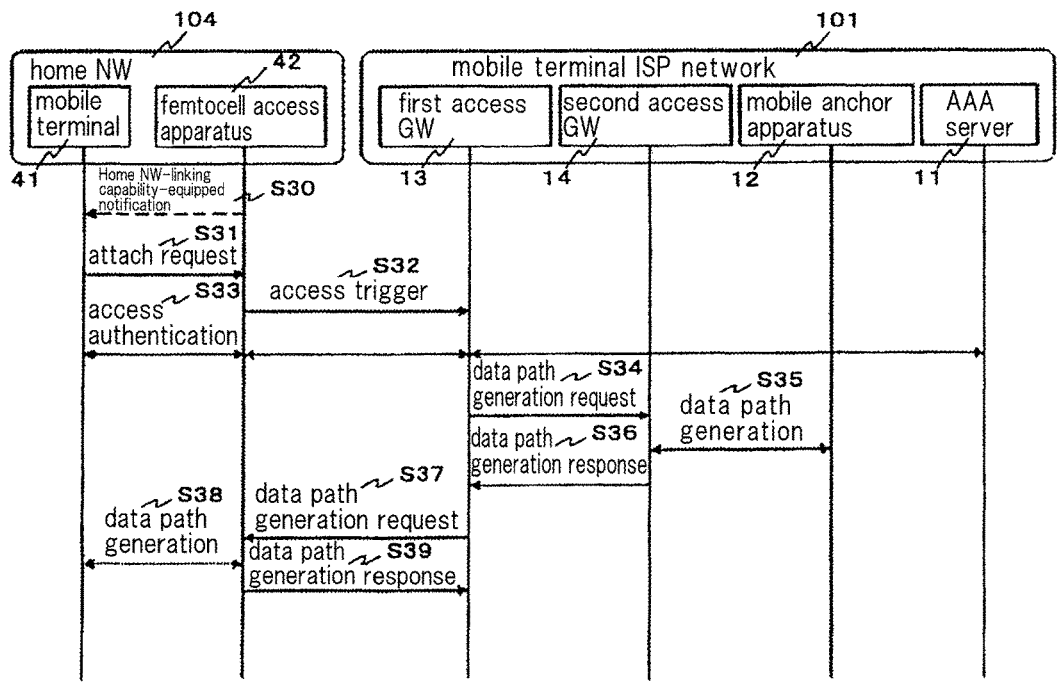
FIG. 6 is a flow chart for describing another example of the operations of the second exemplary embodiment of the present invention.

FIG. 6 is a flow chart for explaining this example of the operations of the second exemplary embodiment of the present invention.

Referring to FIG. 6, femtocell access apparatus 42 first sends by broadcast a HOME NW-linking capability-equipped notification that includes linking capability information to all terminals in cells that include mobile terminal 41 (Step 30).

Next, mobile terminal 41 transmits an attach request to femtocell access apparatus 42 to start access to femtocell access apparatus 42 (Step 31). Because mobile terminal 41 does not desire the Home NW-linking service in this case, mobile terminal 41 appends to the attach request linking-desired information that indicates that the Home NW-linking service is not desired.

Upon receiving the attach request from mobile terminal 41, femtocell access apparatus 42 transmits an attach trigger that includes linking capability information and the linking-desired information that was contained in the attach request to first access GW 13 (Step 32).

Upon receiving the attach trigger, first access GW 13 begins access authentication of mobile terminal 41 (Step 33). Upon detecting from the linking capability information that is contained in the attach trigger that femtocell access apparatus 42 is equipped with the HOME NW-linking capability, first access GW 13 transmits an authentication message to AAA server 11 during access authentication to request determination of whether the Home NW-linking service can be provided to mobile terminal 41.

AAA server 11 next determines whether the Home NW-linking service can be provided based on information relating to mobile terminal 41 and femtocell access apparatus 42 that is contained in the authentication message. If the Home NW-linking service can be provided, AAA server 11 during access authentication notifies first access GW 13 that the service can be provided.

Next, first access GW 13 receives the notification from AAA server function 11 that the Home NW-linking service can be provided, takes into consideration that mobile terminal 41 does not desire the Home NW-linking service, and transmits a data path generation request to second access GW 14 to create a data path between second access GW 14 and mobile anchor apparatus 12 (Step 34). Upon receiving this request, second access GW 14 generates a data path between second access GW 14 and mobile anchor apparatus 12 (Step 35), and upon completion of generation, transmits a data path generation response to first access GW 13 (Step 36).

In order to create a data path between second access GW 14 and mobile terminal 41, first access GW 13 transmits a request to femtocell access apparatus 42 to generate a data path with mobile terminal 41 (Step 37). Upon receiving this request, femtocell access apparatus 42 generates a data path between mobile terminal 41 and femtocell access apparatus 42 (Step 38), and following completion of the generation, returns a data path generation response (Step 39). In this way, a data path is created between second access GW 14 and mobile terminal 41, i.e., between mobile terminal ISP network 101 and mobile terminal 41.

Mobile terminal 41 subsequently carries out communication with servers or terminals on the network (not shown) by way of a data path with mobile terminal ISP network 101.

Operations are next described for a case in which, following the operations shown in the flow chart of FIG. 6 in the present exemplary embodiment, mobile terminal 41 issues a request to femtocell access apparatus 42 to generate a new bearer that is a new data path that allows access to home NW 104 through the Home NW-linking service.

Figure 7:
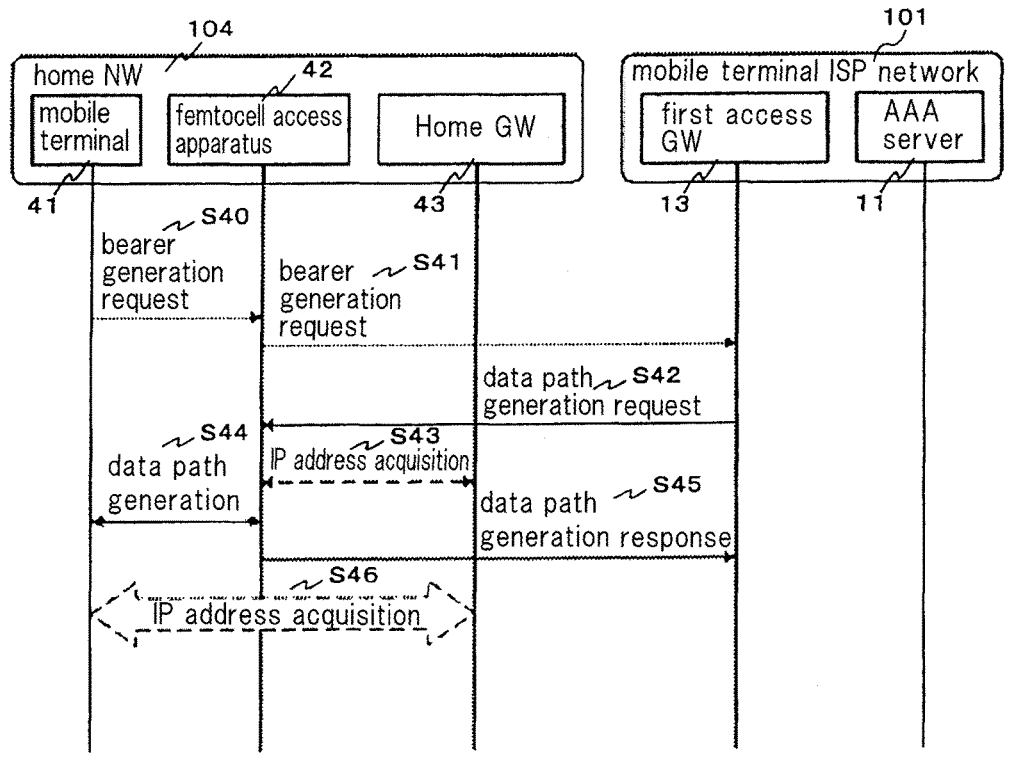
FIG. 7 is a flow chart for describing another example of the operations of the second exemplary embodiment of the present invention.

FIG. 7 is a flow chart for describing another example of the operations of the communication system of the second exemplary embodiment of the present invention. In FIG. 7, it is assumed that as the initial state, mobile terminal 41 implements an access request without desiring a Home NW-linking service, and a data path is therefore established with mobile terminal ISP network 104. It is further assumed that along with these steps, first access GW 13 is notified at the time of access authentication of mobile terminal 41 from AAA server 11 that the provision of a Home NW-linking service to mobile terminal 41 is permitted.

Referring to FIG. 7, mobile terminal 41 first transmits to femtocell access apparatus 42 a bearer generation request to which is appended linking-desired information indicating that a Home NW-linking service is desired (Step 40).

Upon receiving the bearer generation request, femtocell access apparatus 42 transfers the bearer generation request to first access GW 13 (Step 41). When transferring the bearer generation request, femtocell access apparatus 42 may append linking capability information to the bearer generation request.

By analyzing the bearer generation request, first access GW 13 next determines whether mobile terminal 41 is requesting the generation of a new bearer that can provide the Home NW-linking service, and if the generation of a bearer is being requested, checks whether permission to provide the Home NW-linking service to mobile terminal 41 has been supplied from AAA server 11.

Because permission to provide the service has been supplied from AAA server function 11 in this case, first access GW 13 transmits to femtocell access apparatus 42 a data path generation request that contains information instructing the generation of a data path for providing the Home NW-linking service (Step 43).

The subsequent processes (Steps 43-46) are similar to the processes (Steps 14-17) of the first exemplary embodiment shown in FIG. 4, and further explanation is therefore here omitted.

The effect of the present exemplary embodiment is next described.

As described hereinabove, in the present exemplary embodiment, the desire or lack of desire for a Home NW-linking service is clearly expressed at the time that mobile terminal 41 begins access to femtocell access apparatus 42 or at the time of requesting the generation of a new bearer.

As a result, a data path that reflects the desire of mobile terminal 41 can be generated in femtocell access apparatus 42 and mobile terminal ISP network 101.

In addition, femtocell access apparatus 42 sends linking capability information to terminals in cells that include mobile terminal 41, and mobile terminal 41 is therefore able to determine whether the Home NW-linking service is desired or not based on the linking capability information.

WORKING EXAMPLES

Best modes for implementing the present invention are next described using actual working examples.

Working Example 1

Working Example 1 of the present invention is the first exemplary embodiment in concrete form.

Figure 8:
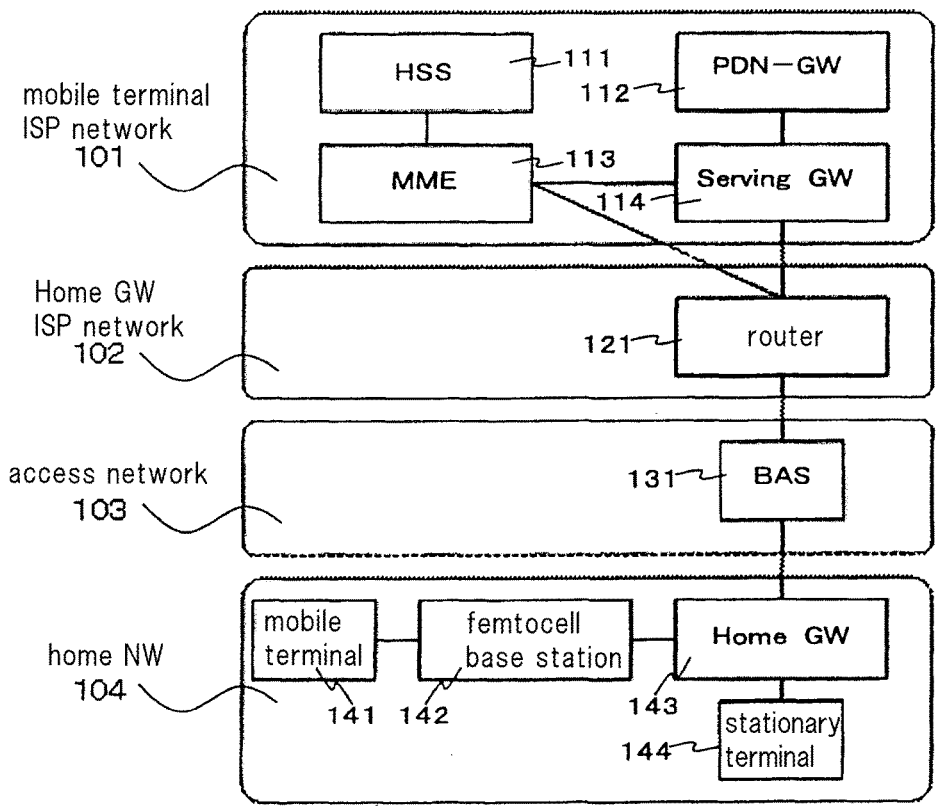
FIG. 8 is a block diagram showing the configuration of the communication system of Working Example 1 of the present invention.

FIG. 8 is a block diagram showing the configuration of the communication system of Working Example 1 of the present invention.

As shown in FIG. 8, the communication system of the present working example is made up from mobile terminal ISP network 101, Home GW ISP network 102, access network 103, and home NW 104, similar to the first exemplary embodiment shown in FIG. 3.

In mobile terminal ISP network 101, HSS 111 corresponds to AAA server 11, PDN-GW 112 corresponds to mobile anchor apparatus 12, MME 113 corresponds to first access GW 13, Serving GW 114 corresponds to second access GW 14; in Home GW ISP network 102, router 121 corresponds to router 21; in access network 103, BAS 131 corresponds to BAS 31; and in home NW 104, mobile terminal 141 corresponds to mobile terminal 41, femtocell base station 142 corresponds to femtocell access apparatus 42, Home GW 143 corresponds to Home GW 43, and stationary terminal 144 corresponds to stationary terminal 44.

The overall operation of the present working example is next described in detail.

Figure 9:
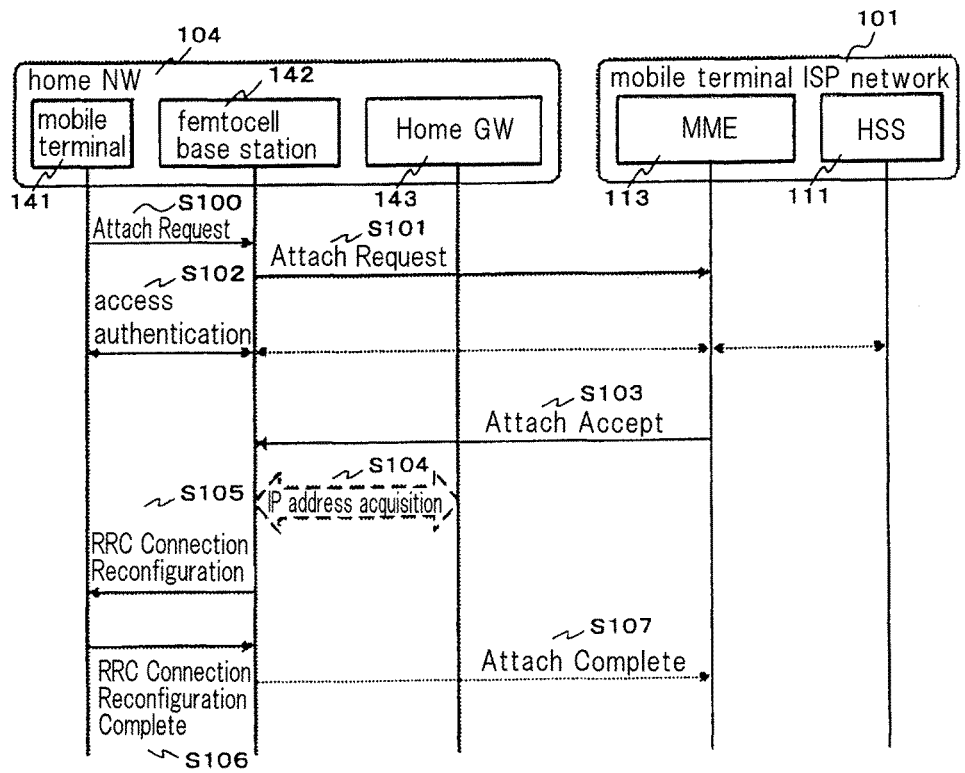
FIG. 9 is a flow chart for describing an example of the operations of the communication system shown in FIG. 8.

FIG. 9 is a flow chart for explaining an example of the operations of the communication system shown in FIG. 8.

Referring to FIG. 9, mobile terminal 141 transmits an Attach Request to femtocell base station 142 as an attach request to begin access to femtocell base station 142 (Step 100).

Upon receiving the Attach Request from mobile terminal 141, femtocell base station 142 transmits to MME 113 an attach Request that contains linking capability information as an attach trigger (Step 101).

Upon receiving the Attach Request, MME 113 begins access authentication of mobile terminal 141 (Step 102). In addition, upon detecting from the Attach Request that femtocell base station 142 is equipped with the HOME NW-linking capability, MME 113 during access authentication transmits an authentication message to HSS 111 to request determination of whether the Home NW-linking service can be provided to mobile terminal 141.

HSS 111 next carries out a determination of whether the Home NW-linking service can be provided based on, for example, information relating to mobile terminal 141 and femtocell base station 142 that is contained in the authentication message. If the Home NW-linking service can be provided, HSS 111 notifies this capability to MME 113 during access authentication.

MME 113 next receives the notification from HSS 111 that the Home NW-linking service can be provided and transmits to femtocell base station 142 an Attach Accept that contains information instructing the generation of a data path for providing the Home NW-linking service as a data path generation request (Step 103).

Upon receiving the Attach Accept, femtocell base station 142 acquires an IP address for mobile terminal 141 from Home GW 143 for the purpose of providing an IP address for providing the Home NW-linking service to mobile terminal 141 (Step 104). When femtocell base station 142 knows an IP address for mobile terminal 141 beforehand, this phase is skipped.

Femtocell base station 142 next exchanges "RRC Connection Reconfiguration/RRC Connection Reconfiguration Complete" with mobile terminal 141 (Steps 105 and 106) and generates a data path between mobile terminal 141 and femtocell base station 142. Femtocell base station 142 further communicates the IP address to mobile terminal 141 in the course of generating the data path between mobile terminal 141 and femtocell base station 142.

Upon completion of the generation of a data path between mobile terminal 141 and femtocell base station 142, femtocell base station 142 transmits to MME 113 an Attach Complete as the data path generation response (Step 107).

Mobile terminal 141 subsequently uses the data path that was generated to access home NW 104 without traversing mobile terminal ISP network 101 and communicates with stationary terminal 144.

Working Example 2

Working Example 2 of the present invention is also an actualization of the first exemplary embodiment.

Figure 10:
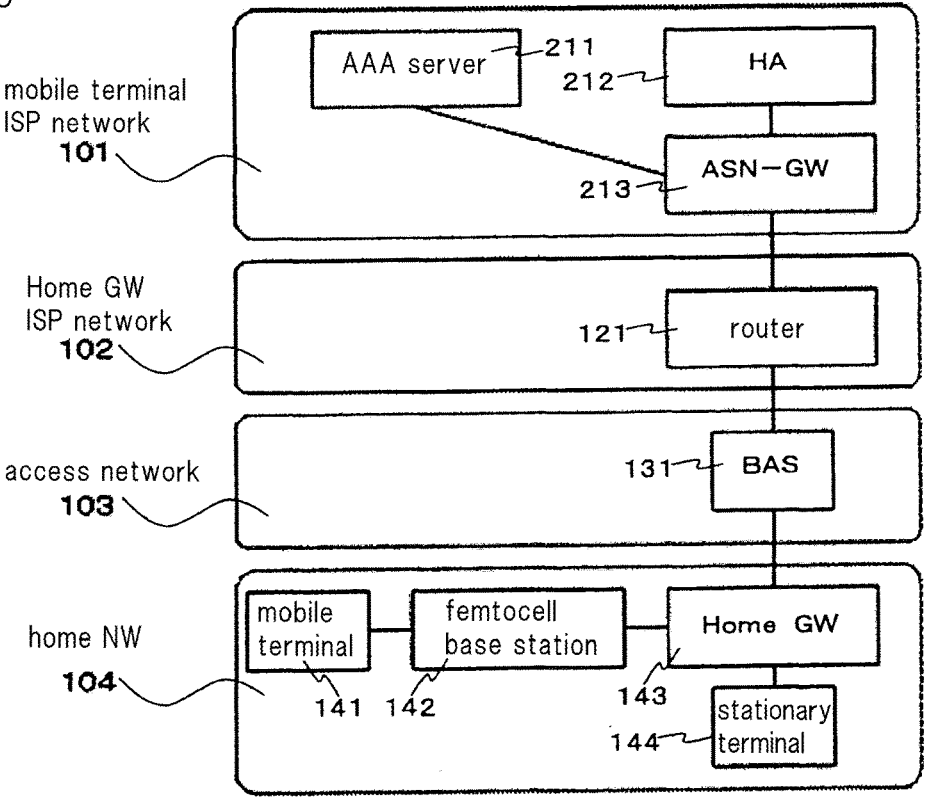
FIG. 10 is a block diagram showing the configuration of the communication system of Working Example 2 of the present invention.

FIG. 10 is a block diagram showing the configuration of the communication system of Working Example 2 of the present invention.

As shown in FIG. 10, the communication system of the present working example is made up from mobile terminal ISP network 101, Home GW ISP network 102, access network 103, and home NW 104, as in the first exemplary embodiment shown in FIG. 3.

In mobile terminal ISP network 101, AAA server 211 corresponds to AAA server 11, HA (Home Agent) 212 corresponds to mobile anchor apparatus 12, and ASN (Access Service Network)-GW 213 corresponds to first access GW 13 and second access GW 14. The other constituent elements are the same as Working Example 1 and further explanation is therefore here omitted.

The overall operation of the communication system of the present working example is next described in detail.

Figure 11:
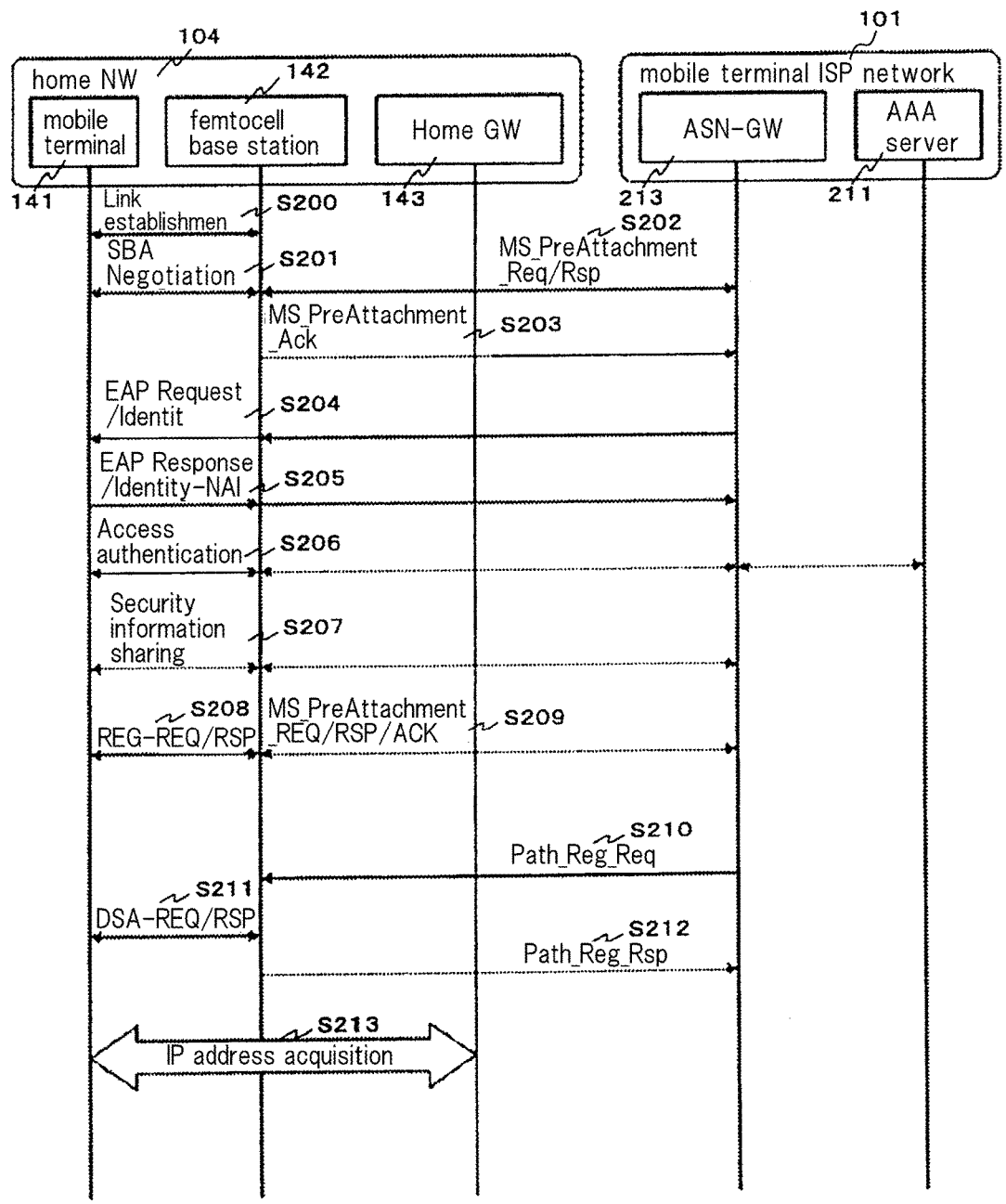
FIG. 11 is a flow chart for describing an example of the operations of the communication system shown in FIG. 10.

FIG. 11 is a flow chart for describing an example of the operations of the communication system shown in FIG. 10.

Referring to FIG. 11, mobile terminal 141 first begins access of femtocell base station 142, and following the establishment of a link with femtocell base station 142 (Step 200), begins SBC (Subscriber Station Capability) Negotiation (Step 201).

In the course of the SBC Negotiation with mobile terminal 141, femtocell base station 142 transmits to ASN-GW 213 an MS_PreAttachment_Req that contains linking capability information as an attach trigger (Step 202).

Upon receiving the MS_PreAttachment_Req, ASN-GW 213 stores the information indicating that femtocell base station 142 is equipped with the Home NW-linking capability and returns an MS_PreAttachment_Res to femtocell base station 142.

Upon completion of SBC Negotiation, femtocell base station 142 transmits an MS_PreAttachment_Ack to ASN-GW 213 (Step 203).

Upon receiving the MS_PreAttachment_Ack, ASN-GW 213 transmits to mobile terminal 141 an EAP Request/Identity by way of femtocell base station 142 to begin the access authentication of mobile terminal 141 (Step 204).

Upon receiving the EAP Request/Identity, mobile terminal 141 returns EAP Request/Identity-NAI to ASN-GW 213 by way of femtocell base station 142 (Step 205).

Upon receiving the EAP Request/Identity-NAI, ASN-GW 213 begins the access authentication of mobile terminal 141 (Step 206). In addition, ASN-GW 213 detects from MS_PreAttachment_Req that femtocell base station 142 is equipped with the Home NW-linking capability, and therefore, during access authentication transmits an authentication message to request AAA server 211 for determination of whether the Home NW-linking service can be provided to mobile terminal 141.

AAA server 211 next determines whether the Home NW-linking service can be provided based on, for example, information relating to mobile terminal 141 and femtocell base station 142 that is contained in the authentication message. If the Home NW-linking service can be provided, AAA server 211 reports this information to ASN-GW 213 during access authentication.

Upon success of the access authentication, ASN-GW 213 executes a registration process for negotiation of the capabilities of MAC (Media Access Control) layers and sharing of security information for encrypting the data that are exchanged between mobile terminal 141 and femtocell base station 142 (Steps 207-209).

Because notification indicating that the Home NW-linking service can be provided has been received from AAA server 211, ASN-GW 213 next transmits, as a data path generation request to femtocell base station 142, a Path_Reg_Req that contains information instructing the generation of a data path for providing the Home NW-linking service (Step 210).

Upon receiving the Path_Reg_Req, femtocell base station 142 exchanges DSA-REQ/RSP with mobile terminal 141 (Step 211) and then generates a data path between mobile terminal 141 and femtocell base station 142.

When the generation of the data path between mobile terminal 141 and femtocell base station 142 has been completed, femtocell base station 142 reports Path_Reg_Rsp to MME 113 as the data path generation response (Step 212).

After completion of the generation of a data path between mobile terminal 141 and femtocell base station 142, mobile terminal 141 executes an IP address acquisition process (Step 213). More specifically, a message of a process such as Stateful Address Configuration or Stateless Auto Address Configuration by DHCP is transferred from femtocell base station 142 to Home GW 143, whereby mobile terminal 141 acquires an IP address that is disbursed by Home GW 143.

Mobile terminal 141 subsequently uses the data path that was generated to access home NW 104 without traversing mobile terminal ISP network 101 and carries out communication with stationary terminal 144.

Working Example 3

Working Example 3 of the present invention is the actualization of the second exemplary embodiment.

The configuration of the communication system of the present working example is similar to the configuration of the communication system of Working Example 1 shown in FIG. 8, but the operations differ from those of Working Example 1 in that mobile terminal 141 clearly expresses whether the Home NW-linking service is desired or not and femtocell base station 142 sends linking capability information to mobile terminal 141.

The overall operations of the communication system of the present working example are next described in detail.

The operations in the present working example in which mobile terminal 141 accesses home NW 104 by way of femtocell base station 142 are first described.

FIG. 12 is a flow chart for describing an example of the operations of the communication system of Working Example 3 of the present invention. In the operations of the present working example shown in FIG. 12, the two points that differ from the operations of the communication system of Working Example 1 shown in FIG. 9 are the use of System Information by femtocell base station 142 to expressly send linking capability information to mobile terminal 141 and the transmission by mobile terminal 141 to femtocell base station 142 of an Attach Request to which is appended linking-desired information that indicates whether mobile terminal 141 desires a Home NW-linking service or not.

Referring to FIG. 12, femtocell base station 142 first uses a System Information message to send linking capability information in a broadcast to all terminals in cells that include mobile terminal 141 (Step 300).

Mobile terminal 141 next transmits an Attach Request to femtocell base station 142 to begin access to femtocell base station 142 (Step 301). At this time, mobile terminal 141 desires a Home NW-linking service and therefore sets the Attach Type of the Attach Request to "femtocell Access."

Upon receiving the Attach Request from mobile terminal 141, femtocell base station 142 includes linking capability information in the Attach Request received from mobile terminal 141 and transfers the Attach Request to MME 113 (Step 302).

Upon receiving the Attach Request, MME 113 begins the access authentication of mobile terminal 141 (Step 303). In addition, upon detecting from the Attach Request that femtocell base station 142 is equipped with the Home NW-linking capability, MME 113 during access authentication transmits an authentication message to request HSS 111 to determine whether the Home NW-linking service can be provided to mobile terminal 141.

HSS 111 next determines whether the Home NW-linking service can be provided based on, for example, information relating to mobile terminal 141 and femtocell base station 142 that is contained in the authentication message. If the Home NW-linking service can be provided, HSS 111 reports this information to MME 113 during access authentication.

MME 113 next receives from HSS 111 notification that the Home NW-linking service can be provided, and taking into consideration the desire for the Home NW-linking service by mobile terminal 141, transmits to femtocell base station 142 an Attach Accept that contains information instructing the generation of a data path for providing the Home NW-linking service (Step 304).

The subsequent processes (Steps 305-308) are the same as the processes (Steps 104-107) of Working Example 1 shown in FIG. 9 and further explanation is therefore here omitted.

Operations are next described regarding a case in the present working example in which, after a data path has been established with mobile terminal ISP network 101, mobile terminal 141 requests the generation of a new bearer that allows access to home NW 104 by the Home NW-linking service. At the time of the access authentication of mobile terminal 141 when generating a data path between mobile terminal 141 and mobile terminal ISP network 101, it is assumed that MME 113 is notified of the permission to provide the Home NW-linking service to mobile terminal 141 from HSS 111.

FIG. 13 is a flow chart for explaining this example of the operations of the communication system of Working Example 3 of the present invention.

Referring to FIG. 13, mobile terminal 141 first transmits, as a bearer generation request to femtocell base station 142, a Request Bearer Resource Allocation to which is appended an LBI (Linked Bearer ID) that indicates the desire for the Home NW-linking service (Step 400).

Upon receiving the Request Bearer Resource Allocation, femtocell base station 142 transfers the request to MME 113 (Step 401).

MME 113 next analyzes the Request Bearer Resource Allocation, and upon determining that the generation of a bearer that allows access to home NW 104 by the Home NW-linking service is being requested by mobile terminal 141, checks whether permission to provide the Home NW-linking service to mobile terminal 141 has been supplied from HSS 111. In this case, permission for providing service has been supplied from HSS 111, and MME 113 therefore transmits, as a data path generation request to femtocell base station 142, a Bearer Setup Request that includes information instructing the generation of a data path for providing the Home NW-linking service (Step 402).

Upon receiving the Bearer Setup Request, femtocell base station 142, in order to provide mobile terminal 141 with an IP address for the Home NW-linking service, acquires an IP address for mobile terminal 141 from Home GW 143 (Step 403). If femtocell base station 142 knows an IP address for use by mobile terminal 141 beforehand, this phase is skipped.

Femtocell base station 142 next exchanges RRC Connection Reconfiguration/RRC Connection Reconfiguration Complete with mobile terminal 141 (Steps 404 and 405) and generates a data path between mobile terminal 141 and femtocell base station 142. In the course of generating the data path, femtocell base station 142 further reports to mobile terminal 141 the IP address that was acquired from Home GW 143.

When the generation of the data path between mobile terminal 141 and femtocell base station 142 is complete, femtocell base station 142 transmits a Bearer Setup Response to MME 113 as the data path generation response (Step 406).

Mobile terminal 141 subsequently uses the data path that was generated to access home NW 104 without traversing mobile terminal ISP network 101 and carries out communication with stationary terminal 144.

Working Example 4

Working Example 4 of the present invention is an actualization of the second exemplary embodiment.

The configuration of the communication system of the present working example is similar to the configuration of the communication system of Working Example 2 shown in FIG. 10, but the operations differ from those of Working Example 2 in that mobile terminal 141 clearly indicates whether there is a desire for Home NW-linking service and femtocell base station 142 sends linking capability information to mobile terminal 141.

The overall operations of the communication system of the present working example are next described in detail.

Explanation first regards the operations in the present working example in which mobile terminal 141 accesses home NW 104 by way of femtocell base station 142.

Figure 14:
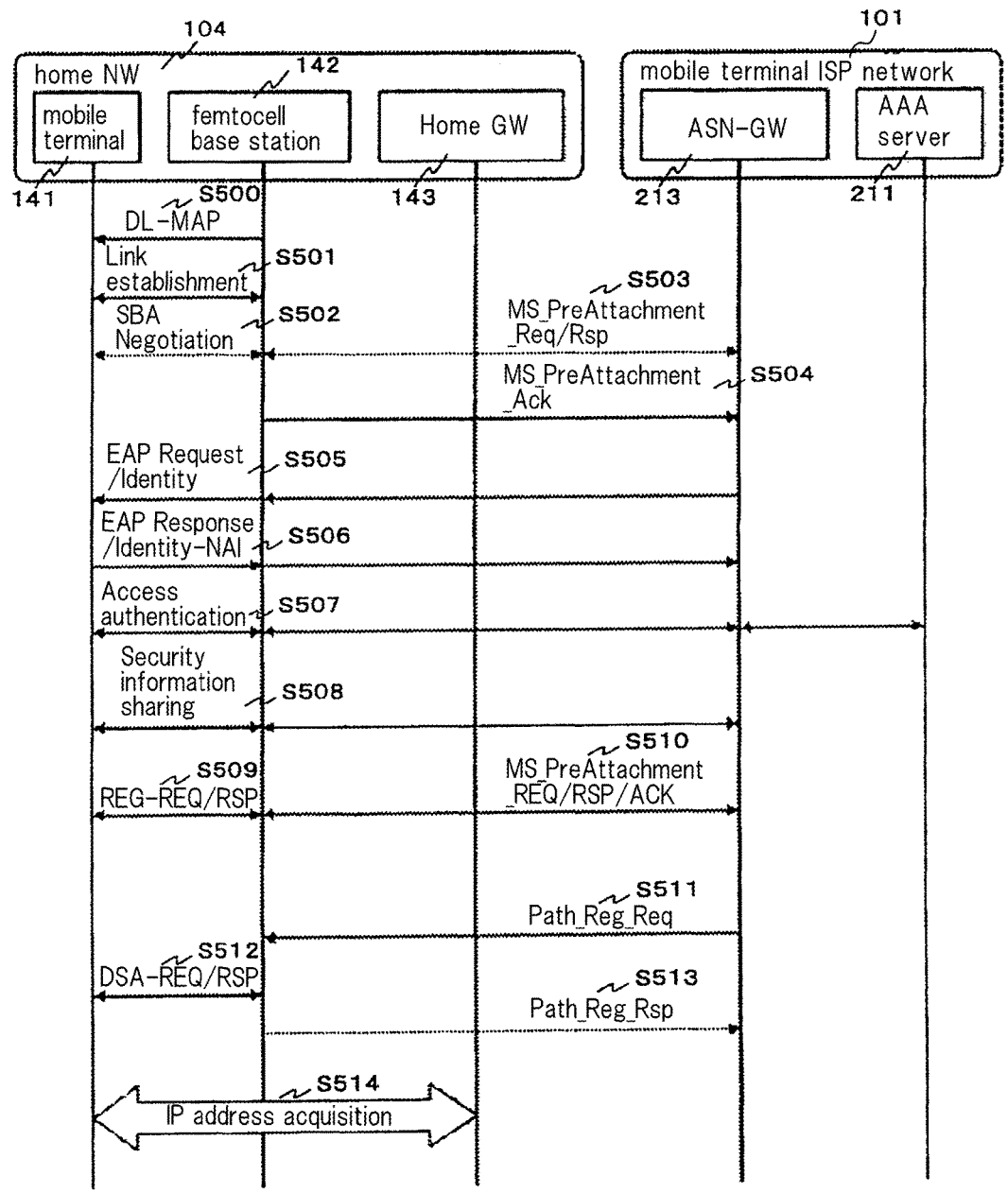
FIG. 14 is a flow chart for describing an example of the operations of the communication system of Working Example 4 of the present invention.

FIG. 14 is a flow chart for describing an example of the operations of the communication system of Working Example 4 of the present invention. In the operations of the present working example shown in FIG. 14, the points of difference with the operations of the communication system of Working Example 2 shown in FIG. 11 are the two points that femtocell base station 142 uses a DL-MAP message to expressly send linking capability information to mobile terminal 141 and that mobile terminal 141 transmits to ASN-GW 213 by way of femtocell base station 142 an EAP Response/Identity that includes linking-desired information that indicates whether the Home NW-linking service is desired or not.

Referring to FIG. 14, femtocell base station 142 first uses the DL-MAP message to send by broadcast linking capability information to all terminals within cells that include mobile terminal 141 (Step 500).

Mobile terminal 141 next begins access to femtocell base station 142, and after a link is established with femtocell base station 142 (Step 501), begins SBC Negotiation (Step 502).

Femtocell base station 142 next, in the process of the SBC Negotiation with mobile terminal 141, transmits to ASN-GW 213 an MS_PreAttachment_Req that includes linking capability information (Step 503).

Upon receiving the MS_PreAttachment_Req, ASN-GW 213 stores the information that femtocell base station 142 is equipped with the capability for enabling Home NW linking and returns an MS_PreAttachment_Rsp to femtocell base station 142.

When the SBC Negotiation is complete, femtocell base station 142 transmits an MS_PreAttachment_Ack to ASN-GW 213 (Step 504).

Upon receiving the MS_PreAttachment_Ack, ASN-GW 213 transmits an EAP Request/Identity to mobile terminal 141 to begin access authentication of the mobile terminal (Step 505).

Because it is here assumed that mobile terminal 141 desires the Home NW-linking service, upon receiving the EAP Request/Identity, mobile terminal 141 sets information that indicates the desire for the Home NW-linking service to the Outer NAI of the EAP Response/Identity and transmits this EAP Response/Identity to ASN-GW 213 (Step 506). A format such as "{at =1} username@realm" can be considered as the format of the information that is set to the Outer NAI. It is here assumed that the desire for the Home NW-linking service is indicated when "at" is an abbreviation of "Attach Type," and the value of the Attach Type is "1."

Because ASN-GW 213 detects from the MS_PreAttachment_Req that femtocell base station 142 is equipped with the Home NW-linking capability, upon receiving the EAP Response/Identity, ASN-GW 213 begins the access authentication of mobile terminal 141 (Step 507) and transmits an authentication message during access authentication to request AAA server 211 to determine whether the Home NW-linking service can be provided to mobile terminal 141.

AAA server 211 next determines whether the Home NW-linking service can be provided based on, for example, information relating to mobile terminal 141 and femtocell base station 142 that is contained in the authentication message. If the Home NW-linking service can be provided, AAA server 211 reports this information to AAA server 213 during access authentication.

The subsequent processes (Steps 508-514) are the same as the processes (Steps 207-213) of Working Example 2 shown in FIG. 11 and further explanation is therefore here omitted.

Explanation next regards operations in the present working example in which, following establishment of a data path with mobile terminal ISP network 101, mobile terminal 141 requests the generation of a new bearer that is able to access home NW 104 through the Home NW-linking service. In addition, it is assumed that at the time of access authentication of mobile terminal 141 when generating a data path between mobile terminal 141 and mobile terminal ISP network 101, ASN-GW 213 is notified of permission from AAA server 211 to provide the Home NW-linking service to mobile terminal 141.

Figure 15:
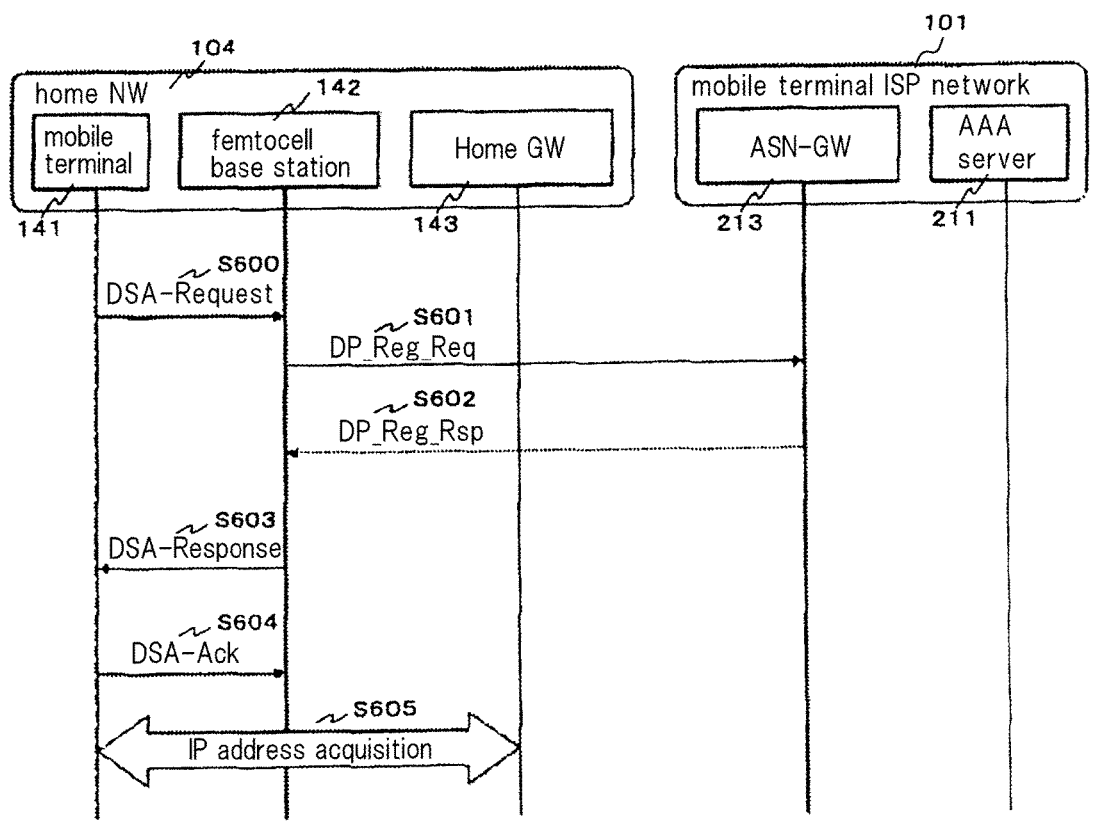
FIG. 15 is a flow chart for describing another example of the operations of the communication system of Working Example 4 of the present invention.

FIG. 15 is a flow chart for explaining an example of the operations of the communication system of Working Example 4 of the present invention.

Referring to FIG. 15, mobile terminal 141 transmits, as a bearer generation request to femtocell base station 142, a DSA (Dynamic Service Addition) Request to which is appended an APN (Access Point Name) that indicates that the Home NW-linking service is desired (Step 600).

Upon receiving the DSA Request, femtocell base station 142 transmits to ASN-GW 213 a DP_Reg_Req indicating that mobile terminal 141 is requesting the generation of a new bearer that can access home NW 104 through the Home NW-linking service (Step 601).

ASN-GW 213 analyzes the DSA Request, and upon determining that mobile terminal 141 is requesting the generation of a bearer that allows access to home NW 104 through the Home NW-linking service, verifies whether permission to provide the Home NW-linking service to mobile terminal 15 has been supplied from AAA server 211. Because permission to provide the Home NW-linking service has been supplied from AAA server 211 in this case, ASN-GW 213 transmits to femtocell base station 142 a DP_Reg_Rsp that includes information that instructs the generation of a data path for providing the Home NW-linking service (Step 602).

Upon receiving the DP_Reg_Rsp, femtocell base station 142 determines that the Home NW-linking service can be provided to mobile terminal 141.

Femtocell base station 142 next exchanges DSA Response/DSA Ack with mobile terminal 141 (Steps 603 and 604) and generates a data path between mobile terminal 141 and femtocell base station 142.

When the generation of the data path between mobile terminal 141 and femtocell base station 142 is completed, mobile terminal 141 acquires an IP address for the Home NW-linking service from Home GW 143 by way of femtocell base station 142 (Step 605).

Mobile terminal 141 subsequently uses the data path that was generated to access home NW 104 without traversing mobile terminal ISP network 101 and communicates with stationary terminal 144.

The method that is carried out in the femtocell base station, authentication means, connection control means, and mobile terminal of the present invention may also be applied to a program for causing execution by the femtocell base station, authentication means, connection control means, and mobile terminal. This program can also be stored in a storage medium or provided to the outside by way of a network.

Although the present invention has been described hereinabove with reference to exemplary embodiments and working examples, the present invention is not limited to these exemplary embodiments and working examples. The construction and details of the present invention as defined in the claims are open to various modifications within the scope of the invention that will be understood by one of ordinary skill in the art.

What is claimed is:

1. A control method of a control device that communicates with a Home Node B for performing local access to another node in same home network or office network, the control method comprising:
   receiving, from the Home Node B, an information element regarding retention of a local access function of the Home Node B and a request for establishment of a U-Plane path, wherein the Home Node B received the request for establishment of the U-Plane path from the mobile terminal;
   performing authentication of the local access; and
   transmitting to the Home Node B from the control device a new bearer establishment request including information for the establishment of the U-Plane path used to perform the local access.

2. A method of a Home Node B in communication with a mobile terminal which performs local access to another node in home network or office network realized by the Home Node B, the method comprising:
   receiving, from the mobile terminal, a request for establishment of a U-Plane path;
   transmitting, to a control device, an information element regarding retention of a local access function of the Home Node B together with the request; and
   receiving a request for establishing a new bearer including information for the establishment of the U-Plane path used to perform the local access, after authentication of the local access between the mobile terminal and the other node is performed by the control device.

3. A method of a mobile terminal that communicates with a Home Node B for performing local access to another node in same home network or office network realized by mobile terminal, the method comprising:
   transmitting, to the home Node B, a request for establishment of a U-Plane path, wherein the Home Node B transmits, to a control device, an information element regarding retention of a local access function of the Home Node B together with the request to the control device; and
   performing the local access using a bearer which the Home Node B configures based on information for the establishment of the U-Plane path included in a new bearer establishment request which is received by the Home Node B from the control device after authentication of the local access between the mobile terminal and the other node is performed by the control device.

* * * * *